United States Patent [19]
Wolff et al.

[11] Patent Number: 6,020,413
[45] Date of Patent: Feb. 1, 2000

[54] FLOOR POLISH VEHICLE COMPOSITIONS EMPLOYING SULFATE- AND SULFONATE-CONTAINING COPOLYMERS

[75] Inventors: Norwin W. Wolff, Marshfield Hills; John C. Dieselman, Scituate, both of Mass.

[73] Assignee: Interpolymer Corporation, Canton, Mass.

[21] Appl. No.: 08/922,557

[22] Filed: Sep. 3, 1997

[51] Int. Cl.[7] .............................. C08J 5/10; C08K 3/10; C08L 33/14
[52] U.S. Cl. .......................... 524/413; 524/428; 524/434
[58] Field of Search .................................. 524/413, 428, 524/434

[56] References Cited

U.S. PATENT DOCUMENTS

| | | | |
|---|---|---|---|
| 3,308,078 | 3/1967 | Rogers et al. | 260/27 |
| 3,403,119 | 9/1968 | Sullivan et al. | 260/28.5 |
| 3,926,888 | 12/1975 | Cheung et al. | 260/29.4 UA |
| 4,243,417 | 1/1981 | Grourke et al. | 106/14.13 |

Primary Examiner—Samuel A. Acquah
Assistant Examiner—U. K. Rajguru
Attorney, Agent, or Firm—Hamilton, Brook, Smith & Reynolds, PC

[57] ABSTRACT

A floor polish vehicle composition includes a polymer component having, among other monomers, carboxyl functional groups and at least one sulfur-containing acidic group, such as a sulfate or sulfonate group. An aqueous component of the floor polish vehicle component includes a multivalent transition metal ion, such as zinc, preferably present as a complex. Typically, the floor polish vehicle composition is an emulsion, wherein the copolymer component is a discontinuous phase and an the aqueous component is a continuous phase. The floor polish vehicle composition can include a polymer component that is a copolymer having carboxyl functional groups and anionic acid functional groups, wherein the anionic acid functional groups have a $pK_a$ of less than about 3.0. An example of a suitable anionic acid functional group is a sulfur-containing acid functional group, such as a sulfate or sulfonate acid group.

40 Claims, 3 Drawing Sheets

FLOOR POLISH VEHICLE COMPOSITIONS EMPLOYING SULFATE- AND SULFONATE-CONTAINING COPOLYMERS

BACKGROUND OF THE INVENTION

Floor polishes generally are sold as an aqueous emulsion vehicle composition, whereby volatilization of the aqueous component of the emulsion causes a dispersed polymer component to form a film that is the resulting polish. However, the polish typically must have physical properties that are distinct from those of the polymer component of the emulsion. For example, following evaporation of the aqueous component of the emulsion, the resulting polish film should present an even appearance, exhibit resistance to physical impact and be relatively inert to the presence of water.

One attempt to impart the necessary physical properties to floor polishes has been the inclusion of a chemical component in the emulsion that reacts with the polymer during volatilization of the aqueous phase. For example, use of a multivalent transition metal, such as zinc, in the aqueous phase, can cause cross-linking of the polymer component consequent to the reaction of the multivalent transition metal and carboxyl groups while the polish dries. Cross-linking by the multivalent transition metal causes the resulting polymer film to be harder and exhibit greater water resistance.

However, an excessive amount of multivalent transition metal can cause premature coagulation and precipitation of the dispersed polymer and metal components. As a result, the emulsion can be difficult to spread properly or exhibit poor drying, and can cause the polish to exhibit an uneven appearance. Therefore, the utility of multivalent transition metals to improve the quality of floor polishes has been limited.

An attempt to increase the amount of multivalent transition metal that generally can be employed has included use of a nonionic surfactant. A secondary outer layer on the dispersed polymeric particles is formed by the nonionic surfactant, thereby improving product stability in the aqueous phase. Use of a nonionic surfactant has typically enabled a stoichiometric ratio of transition metal to the available reactive groups of the polymers, e.g. carboxyl groups, of up to about 1:2. See, for example, U.S. Pat. No. 3,308,078, issued to J. R. Rogers et al. on Mar. 7, 1967.

In another attempt, such as described in U.S. Pat. No. 4,517,330, issued to Zdanowski et al. on May 14, 1985, the basic salt of an alkaline metal, such as sodium or potassium, has been employed. The alkaline metal further improves the stability of the polymer, thereby enabling up to a stoichiometric equivalence of transition metal without premature coagulation. However, the alkali metal does not dissipate during evaporation of the aqueous phase. Consequently, the alkali metal remains in the polymer film and often causes the polish to be brittle and to exhibit diminished resistance to water.

Therefore, a need exists to overcome or minimize the above-referenced problems associated with floor polish vehicle compositions.

SUMMARY OF THE INVENTION

The present invention is directed to a floor polish vehicle composition.

The floor polish vehicle composition includes a polymer component that include carboxyl functional groups and at least one sulfur-containing acid functional group. An aqueous component of the floor polish vehicle composition includes a multivalent transition metal ion.

In an alternative embodiment, the polymer component includes a copolymer having carboxyl and anionic acid functional groups. The anionic functional groups have a $pK_a$ of less than about 3.0.

The present invention has many advantages. For example, the amount of multivalent transition metal that is employed can be greatly increased over that which typically otherwise can be used in the presence of a nonionic surfactant. Also, additional basic salts of alkali metals are not required, thereby significantly diminishing the amount of alkali metal that remains in the polish. Therefore, the resulting floor polish does not exhibit the brittleness generally associated with methods that incorporate basic salts of alkali metals, such as sodium hydroxide. Further, nonionic surfactants can be employed in combination with the floor polish vehicle composition of the invention in reduced amounts to enhance specific properties of the floor polish, such as improved water resistance, stability and flow characteristics.

DESCRIPTION OF PREFERRED EMBODIMENTS

Figure 1:
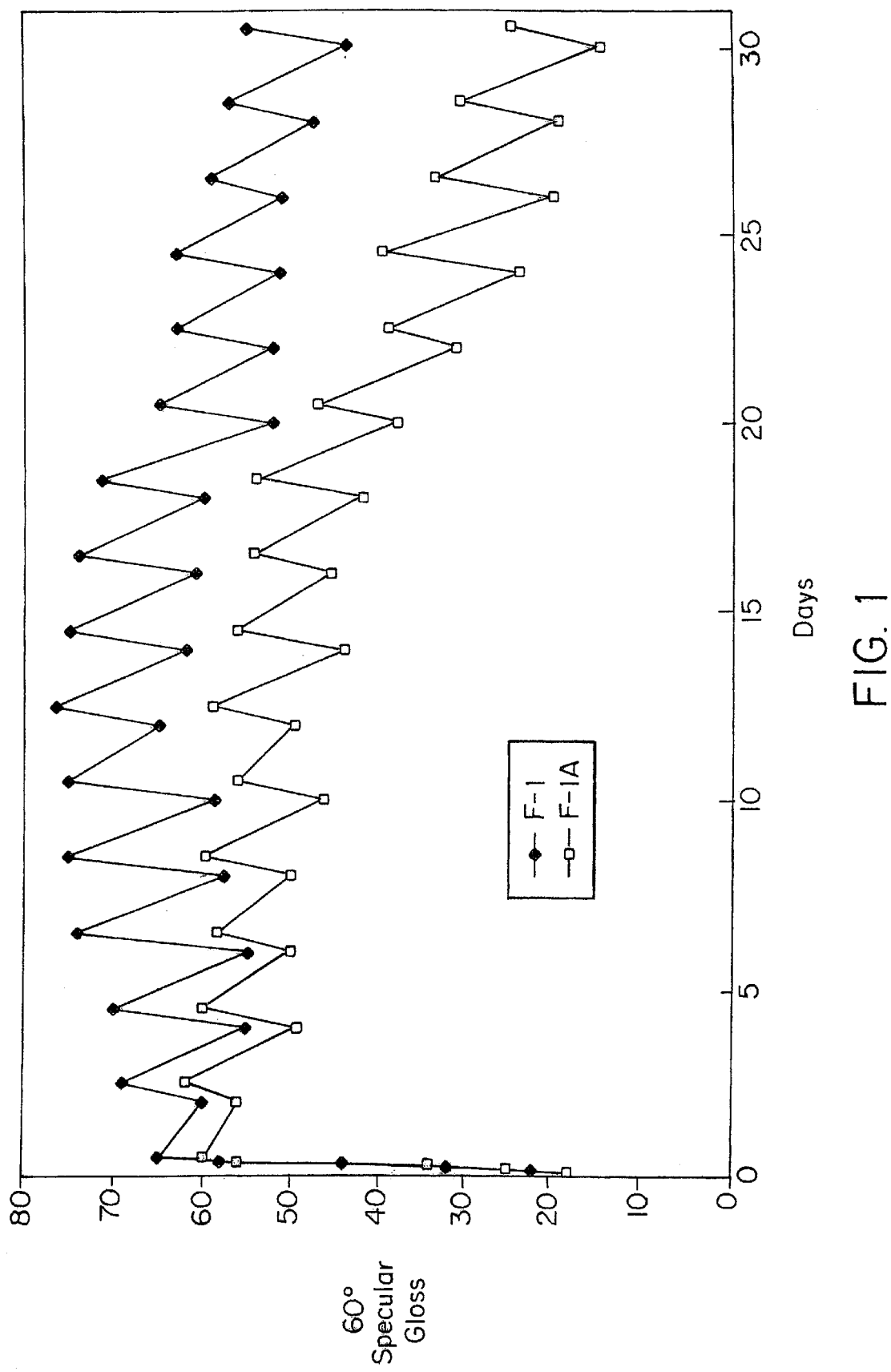
FIG. 1 is a plot of specular gloss exhibited by one embodiment of a floor polish formed by the floor polish vehicle composition of the invention, before and after buffing, in a heavily trafficked corridor over a period of thirty days, as compared to a composition that does not include a sulfur-containing acid functional group, the sodium salt of 2-acrylamide-2-methyl propane sulfonic acid (NaAMPS).

The features and other details of the floor polish vehicle composition will now be more particularly described with reference to the accompanying drawings and pointed out in the claims. It will be understood that the particular embodiments of the invention are shown by way of illustration and not as limitations of the invention. The principal features of this invention can be employed in various embodiments without departing from the scope of the invention. All parts and percentages are by weight unless otherwise specified.

The floor polish vehicle composition of the invention includes, inter alia, a polymer component and an aqueous component. A "floor polish vehicle composition," as defined herein, means a composition that, when spread on a floor, will form a floor polish film during evaporation of the aqueous component and other volatile components.

The polymer component includes a carboxyl functional group and at least one sulfur-containing acid group. Examples of suitable sulfur-containing acid groups include sulfate and sulfonate functional groups. Preferably, the sulfate and sulfonate groups have a pKa of less than about 3.0. The sulfur-containing acid monomers can be, for example, in the form of alkali metal or ammonium salts. A particularly suitable sulfonate monomer for forming a copolymer component of the floor polish vehicle composition of the invention is the sodium salt of 2-acrylamide-2-methyl propane sulfonic acid.

In one embodiment, the carboxyl and sulfur-containing functional groups are components of at least one polymer, such as a copolymer. Alternatively, the carboxyl and sulfur-containing functional groups are each components of distinct polymers.

Generally, the sulfur-containing acid group is a salt of an alkali metal. Examples of suitable alkali metals include sodium, potassium, lithium and rubinium. Also, the amount of sulfur-containing groups in the polymer can be, in one embodiment, in a range of between about 0.1% and about 5% by weight of the polymer. Generally, the amount of the carboxyl-containing component in the polymer is in a range of between about 5% and about 25% by weight of the polymer, providing for an acid number of the copolymer of between about 30 and about 170.

The amount of multivalent transition metal in the aqueous component of the floor polish vehicle composition can be, in one embodiment, up to about a stoichiometric equivalent of the carboxyl functional groups of the polymer. Preferably, the amount of the transition metal component is in a range of between about 25% and about 75% of the stoichiometric equivalent of the carboxyl group of the polymer component.

Preferably, the multivalent transition metal of the aqueous component is zinc. In one embodiment, the zinc can be present in the aqueous component in the form of a complex, such as an ammonia or amine-based complex. An example of a suitable complex is an ammonia-based complex, such as $Zn(NH_3)_4^{2+}CO_3^{2-}$. In other embodiments, the zinc can be complexed with a volatilizable acid, such as acetic acid or formic acid in place of $CO_3^{2-}$.

Preferably, the floor polish vehicle composition is an emulsion, wherein the polymer component is dispersed within the continuous aqueous component. Either the aqueous component or the polymer component of the floor polish vehicle composition can include a nonionic surfactant component. An example of a suitable nonionic surfactant has a structural formula of $CH_3R—CH_2O(CH_2—CH_2O)_xH$, where x is a value in a range between about 8 and about 40 and R is a long-chain alkyl alcohol or alkyl phenol. Optionally, or alternatively, anionic surfactants can also be employed. More specific examples of suitable surfactants include alkali metal and ammonium salts of long chain alkyl, aryl, alkylaryl sulfates, sulfonates and polyether sulfates or sulfonates. Also, phosphate esters can be employed as emulsifying agents. Preferably, the emulsifying agent is sodium lauryl sulfate. Generally, the amount of surfactant in the floor polish vehicle composition is in a range of between about 0.5% and about 10% of the weight of the polymer component.

In other embodiments, the copolymer of the polymer component can include at least one or more acrylic ester components, and/or one or more methacrylic ester components. Preferably, the amount of the acrylic ester and/or methacrylic ester is present in an amount up to about 95% by weight of the copolymer. Also, a copolymer of the floor polish polymer composition can include up to about 70% of at least one vinyl aromatic monomer component, such as styrene, α-methyl styrene, or vinyl toluene, or combinations thereof.

General techniques associated with emulsion polymerization suitable for forming the floor polish vehicle composition of the invention are discussed in D. C. Blackley, *Emulsion Polymerization* (Wiley, 1975), the teachings of which are incorporated herein by reference in their entirety. Preferably, the method of forming the floor polish vehicle composition of the invention includes employment of an initiator. Examples of suitable reaction initiators include free radical-type polymerization initiators or oxidizing agents, such as tert-butyl hydroperoxide, cumyl hydroperoxide, benzoyl peroxide and hydrogen peroxide. Other examples of polymerization initiators include 2,2 azobis(2-methylpropanenitrile), ammonium, sodium, or potassium persulfate used alone, or in conjunction with a suitable accelerator, or reducing agent, such as potassium or sodium metabisulfite, or sodium thiosulfite. Preferably, the polymerization initiator is sodium or potassium persulfate. Typically, the amount of accelerator and initiator, if employed, is in a range of between about 0.01 and 1 part per 100 parts of monomer to be polymerized.

Anionic or nonionic emulsifying agents can be employed in the formation of the floor polish vehicle. In one embodiment, the amount of emulsifying agent is in a range of between about 0.5 and about 10% of the total weight of all monomers ultimately employed. Preferably, the emulsifying agent is sodium lauryl sulfate. Also, preferably, the monomer mixture is added to the emulsifying solution while the emulsifying solution is at a temperature in a range of between about 20° C. and about 95° C., and most preferably at a temperature in a range of between about 80° C. and about 85° C.

Optionally, a cross-linking monomer can be included in the reaction mixture. Examples of suitable cross-linking monomers include acrylamide, N-methylol acrylamide, and N-methylol methacrylamide, diacrylates, dimethacrylates, etc., and mixtures thereof. As an option, a suitable chain transfer agent, such as mercaptans, to control molecular weight of the copolymer during reaction, can also be employed.

Monomer components including the sulfur-containing acid component are added to the reaction vessel containing water, the reaction initiator and emulsifier, over a period of between about one and about six hours, at a temperature in a range of between about 20 and about 95° C. Preferably, the monomers are added to the reaction vessel over a period of about three hours at a temperature in a range of between about 80 and about 85° C.

Other carboxyl-containing monomer components can be included, such as α, β-monoethylenically unsaturated acids, including maleic, fumaric, aconitic, crotonic, or itaconic acid. Further, half esters of unsaturated dicarboxylic acids can be employed. Preferably, acrylic and methacrylic acids are included as the monomers of the monomer reaction mixture to provide carboxyl groups to the copolymer product.

Up to about 70% of the monomer component in the monomer reaction mixture can include at least one vinyl aromatic monomer, such as styrene, α-methyl styrene, vinyl toluene, or combinations thereof. In addition, up to about 40% of the monomer component of the reaction mixture can include a non-ionogenic monomer, such as acrylonitrile, hydroxypropylmethacrylate or hydroxyethylmethacrylate. Up to 95% of the monomer component of the reaction mixture can include at least one monomer from the acrylate and methacrylate acid esters, such as methyl methacrylate, methylacrylate, ethylmethacrylate, ethylacrylate, n-butyl acrylate, n-butyl methacrylate, etc.

Following addition of the monomer components, the reactor is maintained at the reaction temperature for an additional period in a range of between about one and about three hours to complete the polymerization. Preferably, the period is about one hour. The resulting copolymer emulsion then is cooled to a temperature in a range of between about 25° and about 50° C. Preferably, the emulsion is cooled to a temperature of about 30° C.

The pH of the aqueous phase of the copolymer emulsion is then adjusted to a range of between about 8.5 and about 9.5 with a basic polyvalent transition metal complex. Preferably, the polyvalent transition metal complex is $Zn(NH_3)_4^{2+}CO_3^{2-}$. Thereafter, the emulsion is adjusted with water to obtain a proportion of solids in a range of between about 30% and about 50%, by weight. Preferably, the amount of solids in the resulting floor polish vehicle composition is about 40%, by weight.

Similarly, two or more distinct polymers can be formed, rather than a copolymer, by, for example, adding the sulfur-containing monomer and carboxyl-containing monomer in an order, and at rates, that cause formation of a first polymer or copolymer that includes the sulfur-containing functional group, and afterward, formation of a second polymer, or copolymer that includes the carboxyl-containing functional group.

The invention will now be further described by the following examples. All parts and percentages are by weight unless otherwise specified.

EXEMPLIFICATION

The following examples demonstrate the preparation of polymeric emulsions within the scope of this invention.

PREPARATION OF POLYMERIC EMULSIONS

Monomer mixtures having the composition described in Examples 1–3 were prepared and thoroughly mixed.

In each of the examples, water was added to the reaction vessel along with 2.5% sodium lauryl sulfate and heated while the reactor was purged with nitrogen. A solution of 0.02% potassium persulfate was prepared by mixing the persulfate in warm water. When the reactor water reached 80° C., a sufficient quantity of persulfate solution and the NaAMPS were added to the reaction vessel. Next, the monomer mixture(s) was added to the vessel over a 3 hour period, while maintaining a temperature of 80–85° C. At the end of the 3 hour period the emulsion was allowed to completely react by holding the vessel at 80–85° C. for one hour. The emulsion was then cooled to 30° C. The polymer then was neutralized with a basic polyvalent metal complex to a pH of 8.5 to 9.5. The complex was $Zn(NH_3)_4^{2+}CO_3^{2-}$. Each emulsion was then adjusted to 40% solids.

| MONOMER | PERCENT | |
|---|---|---|
| | Example 1 | Example 1A |
| MMA | 40 | 40 |
| BA | 30 | 30 |
| GMAA | 8.5 | 10 |
| ST | 20 | 20 |
| NaAMPS | 1.5 | |
| | Example 2 | Example 2A |
| MMA | 40 | 40 |
| BA | 25 | 25 |
| EA | 10 | 20 |
| AA | 8.2 | 10 |
| ST | 15 | 15 |
| NaAMPS | 1.8 | |
| | Example 3 | Example 3A |
| MMA | 40 | 40 |
| BA | 20 | 20 |
| 2-EHA | 10 | 10 |
| GAA | 5 | 5 |
| GMAA | 7 | 9.2 |
| ST | 15.8 | 15.8 |
| NaAMPS | 2.2 | |

Monomer Abbreviations
MMA  methyl methacrylate
BA  n-butyl acrylate
EA  ethyl acrylate
2-EHA  2-ethyl hexylacrylate
GMAA  glacial methacrylic acid
GAA  glacial acrylic acid
ST  styrene
NaAMPS  the sodium salt of 2-acrylamide-2 methyl propane sulfonic acid The test emulsions were neutralized with the zinc solution until emulsion instability was noted. The test data indicated that the inclusion of NaAMPS into the copolymer permitted significantly higher levels of zinc solution to be added to the emulsion without instability.

TABLE 1

Emulsion properties

| Emulsion properties | 1 | 1A | 2 | 2A | 3 | 3A |
|---|---|---|---|---|---|---|
| % zinc (Zn metal/ polymer solids) | 2.17 | 0.95 | 2.23 | 1.00 | 2.71 | 1.33 |
| pH @ 22° C. | 9.2 | 8.5 | 8.8 | 8.5 | 9.1 | 8.6 |
| Viscosity (cps @ 22° C.) | 30 | 32 | 28 | 33 | 30 | 35 |

Floor Polish Formulation

| | |
|---|---|
| water | 42.6 percent |
| tributoxyethyl phosphate | 1.7 |
| diethylene glycol methyl ether | 6.1 |
| 1% Fluorad ™ FC-129 (The 3M Company) solution | 0.6 |
| test copolymer emulsion @ 38% solids | 37.1 |
| Syntran ® PA-1445 (Interpolymer Corporation) @ 40% solids | 5.5 |
| Syntran ® 6150 (Interpolymer Corporation) @ 40% solids | 2.7 |
| Syntran ® 1560 (Interpolymer Corporation) @ 25% solids | 3.7 |
| Total | 100.0 percent |
| polymer/resin/wax ratio: | 77/5/12:6 |

To evaluate the performance of the example copolymer emulsions, the emulsions were incorporated into the above floor polish formulation. The formulated polishes were then evaluated using industry standard bench testing procedures. The results are given in Table 2.

Floor tests were conducted in a corridor having 12" by 12" vinyl composition tiles. The corridor was approximately 15 feet wide and 50 feet long. The corridor was stripped of old polish and divided into six equal areas. To each section, five coats of the test polishes were applied. The polishes were applied at a rate of 1800–2000 square feet per gallon. The polishes were allowed to dry for 30 minutes between coats. Daily maintenance consisted of dust mopping only. The floor was washed with water prior to burnishing. The floor was burnished with a 2000 rpm propane machine with a 3300 Natural Blend White Pad made by 3M Company. Traffic in the test area was considered heavy.

Figure 2:
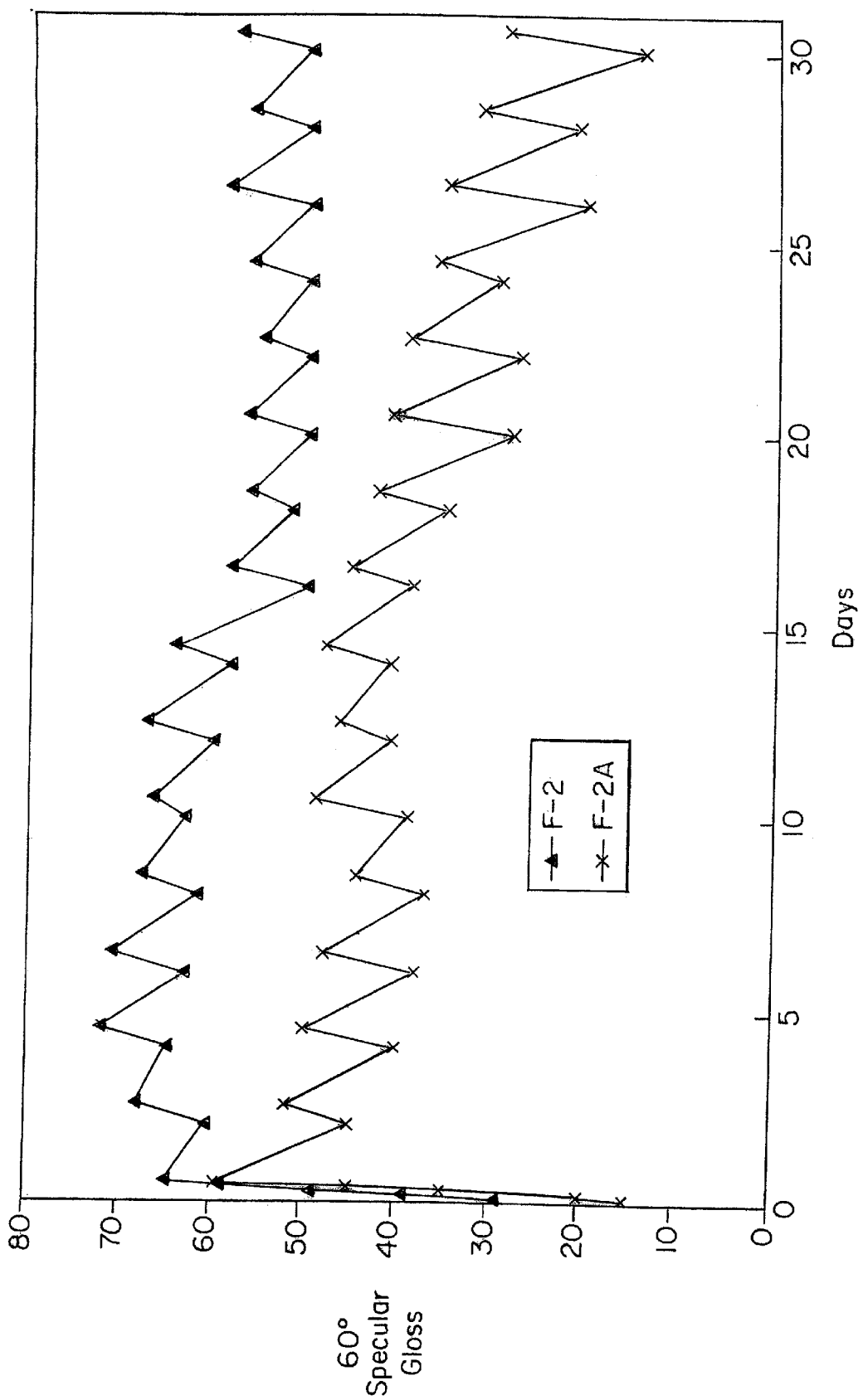
FIG. 2 is a plot of specular gloss exhibited by another embodiment of a floor polish formed by the floor polish vehicle composition of the invention, before and after buffing, in a heavily trafficked corridor over a period of thirty days, as compared to a composition that does not include NaAMPS.
Figure 3:
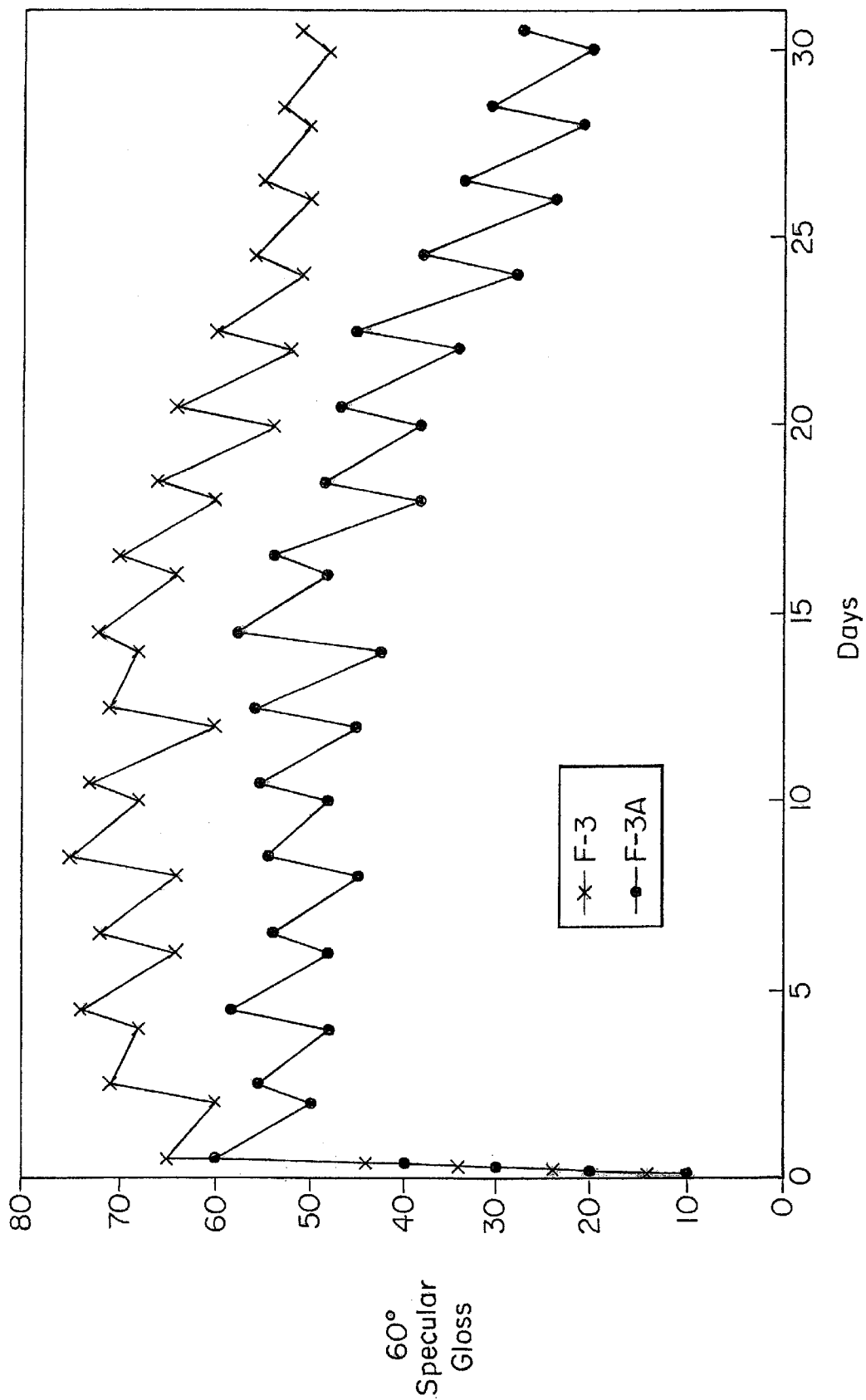
FIG. 3 is a plot of specular gloss exhibited by yet another embodiment of a floor polish formed by the floor polish vehicle composition of the invention, before and after buffing, in a heavily trafficked corridor over a period of thirty days, as compared to a composition that does not include NaAMPS.

Floor polish performance was measured by specular gloss retention over time. Sixty degree specular gloss readings were taken every second day, before and after buffing. The polish comparisons are graphed on FIGS. 1 through 3.

As can be seen from the above data, the copolymer emulsions containing NaAMPS produced floor polishes with considerably greater durability when exposed to heavy traffic over extended periods of time.

TABLE 2

Bench test results

|  | F-1 | F-1A | F-2 | F-2A | F-3 | F-3A |
|---|---|---|---|---|---|---|
| solids ASTM D 2834 | 20.1 | 20.2 | 20.0 | 20.01 | 20.1 | 20.0 |
| pH ASTM E 70 | 8.6 | 8.5 | 8.8 | 8.5 | 8.7 | 8.5 |
| 60 deg specular gloss ASTM D 1455 | 65 | 64 | 66 | 62 | 68 | 65 |
| depth of gloss | exc. | v. good | exc. | good | exc. | v. good |
| leveling | exc. | exc. | exc. | v. good | exc. | v. good |
| recoatability initial/final ASTM D 1793 | exc./exc. | good/good | exc./exc. | fair/poor | good/good | fair/poor |
| 24 hour water spot initial/final ASTM D 1798 | exc./exc. | good/fair | exc./exc. | good/good | v. good/good | fair/poor |
| rubber heel mark resistance CSMA BULLETIN 9-73 | exc. | good | exc. | good | exc. | good |
| powder resistance ASTM D 2048 | exc. | exc. | exc. | exc. | exc. | exc. |
| crazing | none | none | none | none | none | none |
| removability ASTM D 1792 | exc. | exc. | v. good | v. good | exc. | exc. |
| detergent resistance ASTM D 3207 | v. good | fair | exc. | poor | v. good | poor |
| oven stability @ 52° C. ASTM D. 3209 | pass | pass | pass | fail | pass | fail |
| freeze - thaw stability ASTM D 3209 | pass | pass | pass | pass | pass | pass |
| slip index ASTM D 2047 | 0.51 | 0.58 | 0.54 | 0.60 | 0.52 | 0.58 |
| sward rocker hardness | 35 | 30 | 33 | 28 | 38 | 31 |

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A floor polish vehicle composition, comprising:
   a) a polymer component that includes a carboxyl functional group and at least one sulfur-containing acid group; and
   b) an aqueous component that includes a multivalent transition metal ion.

2. The floor polish vehicle composition of claim 1, wherein said polymer component is dispersed within said aqueous component, said floor polish vehicle composition being an emulsion.

3. The floor polish vehicle composition of claim 1, wherein the carboxyl and sulfur-containing functional groups are components of at least one polymer.

4. The floor polish vehicle composition of claim 3, wherein the carboxyl function group is a component of a first polymer, and the sulfur-containing group is a component of a second polymer.

5. The floor polish vehicle composition of claim 3, wherein the polymer is a copolymer.

6. The floor polish vehicle composition of claim 5, wherein the copolymer includes 2-acrylamide-2-methyl propane sulfonic acid.

7. The floor polish vehicle composition of claim 1, wherein the sulfur-containing acid group is a salt of an alkali metal.

8. The floor polish vehicle composition of claim 7, wherein the alkali metal is sodium.

9. The floor polish vehicle composition of claim 7, wherein the alkali metal is potassium.

10. The floor polish vehicle composition of claim 7, wherein the alkali metal is lithium.

11. The floor polish vehicle composition of claim 7, wherein the alkali metal is rubinium.

12. The floor polish composition of claim 1, wherein the sulfur-containing acid group is an ammonium-based salt.

13. The floor polish composition of claim 12, wherein the ammonium-based salt is a copolymerized ammonium salt of 2-acrylamide-2 methyl propane sulfonic acid.

14. The floor polish composition of claim 1 wherein the sulfur-containing acid group is a sodium-based salt.

15. The floor polish composition of claim 14 wherein the sodium-based salt is a copolymerized sodium salt of 2-acrylamide-2 methyl propane sulfonic acid.

16. The floor polish composition of claim 1 wherein the carboxyl functional group is a component of a copolymerized methacrylic acid.

17. The floor polish composition of claim 1 wherein the carboxyl functional group is a component of a copolymerized acrylic acid.

18. The floor polish composition of claim 1 wherein the carboxyl functional group is a component of a copolymerized methacrylic acid and a copolymerized acrylic acid.

19. The floor polish vehicle composition of claim 5, wherein a component of the copolymer that includes the sulfur-containing acid group is present in an amount in a range of between about 0.1% and about 5% by weight of the copolymer.

20. The floor polish vehicle composition of claim 19, wherein a component of the copolymer that includes the carboxyl group is present in an amount in a range of between about 5% and about 25% by weight of the copolymer.

21. The floor polish vehicle composition of claim 1, wherein the multivalent transition metal of the aqueous component is in the form of a complex.

22. The floor polish vehicle composition of claim 21, wherein the multivalent transition metal includes zinc.

23. The floor polish vehicle composition of claim 22, wherein the amount of zinc present is up to about a stoichiometric equivalent of the carboxyl functional group of the polymer.

24. The floor polish vehicle composition of claim 23, wherein the amount of zinc present is in a range of between about 25% and about 75% of the stoichiometric equivalent of the carboxyl group of the polymer.

25. The floor polish vehicle composition of claim 19, wherein the zinc is present in the aqueous component in the form of a complex.

26. The floor polish vehicle composition of claim 25, wherein the complex includes an amine-based complex.

27. The floor polish vehicle composition of claim 26, wherein the complex includes an ammonia-based complex.

28. The floor polish vehicle composition of claim 27, wherein the ammonia-based complex includes $Zn(NH_3)_4^{2+}$ $CO_3^{2-}$.

29. The floor polish vehicle composition of claim 26, wherein the zinc is complexed with a volatilizable acid.

30. The floor polish vehicle composition of claim 29, wherein the volatilizable acid includes acetic acid.

31. The floor polish vehicle composition of claim 29, wherein the volatilizable acid includes formic acid.

32. The floor polish vehicle composition of claim 1, wherein the aqueous component further includes a nonionic surfactant.

33. The floor polish vehicle composition of claim 32, wherein the nonionic surfactant has the structural formula of $CH_3R—CH_2O(CH_2—CH_2))_xH$ where x is a value in a range of between about eight and about forty, and wherein R is a long-chain alkyl alcohol or alkyl phenol.

34. The floor polish vehicle composition of claim 5, wherein the copolymer further includes at least one acrylic ester component.

35. The floor polish vehicle composition of claim 34, wherein the copolymer further includes a plurality of acrylic ester components.

36. The floor polish vehicle composition of claim 5, wherein the copolymer further includes at least one methacrylic ester component.

37. The floor polish vehicle composition of claim 5, wherein the copolymer further includes a plurality of methacrylic ester components.

38. The floor polish vehicle composition of claim 5, wherein the copolymer further includes a vinyl aromatic component.

39. The floor polish vehicle composition of claim 5, wherein the copolymer further includes a nonionogenic hydrophilic component that is selected from the group consisting of acrylonitrile, hydroxypropyl methacrylate, hydroxyethylmethacrylate, hydroxyethylacrylate, hydroxypropylacrylate, acrylamide, methacrylamide and N-methylolacrylamide.

40. A floor polish vehicle composition, comprising:
   a) a polymer component that includes a copolymer having carboxyl functional group and sulfur-containing anionic acid functional groups, wherein the sulfur-containing anionic acid functional groups have a $pK_a$ of less than about 3.0; and
   b) an aqueous component that includes a multivalent transition metal ion.

* * * * *